United States Patent
Kakadia et al.

(10) Patent No.: US 9,276,873 B2
(45) Date of Patent: Mar. 1, 2016

(54) TIME-BASED QOS SCHEDULING OF NETWORK TRAFFIC

(71) Applicant: Verizon Patent and Licensing Inc., Arlington, VA (US)

(72) Inventors: Deepak Kakadia, Union City, CA (US); Lalit R Kotecha, San Ramon, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 243 days.

(21) Appl. No.: 13/684,454

(22) Filed: Nov. 23, 2012

(65) Prior Publication Data

US 2014/0146682 A1 May 29, 2014

(51) Int. Cl.
| H04L 12/24 | (2006.01) |
| H04J 3/24 | (2006.01) |
| H04L 12/927 | (2013.01) |
| H04L 12/841 | (2013.01) |
| H04L 12/913 | (2013.01) |

(52) U.S. Cl.
CPC .............. H04L 47/805 (2013.01); H04L 47/28 (2013.01); H04L 47/724 (2013.01)

(58) Field of Classification Search
CPC ..... H04L 47/30; H04L 47/28; H04L 41/0823; H04L 47/724; H04L 5/02; H04L 47/805; H04L 41/22; H04W 48/10; H04W 28/10
USPC ................. 370/238, 230, 94.1, 85.6
See application file for complete search history.

(56) References Cited

U.S. PATENT DOCUMENTS

| 5,062,106 A * | 10/1991 | Yamazaki et al. ............ 370/397 |
| 5,819,112 A * | 10/1998 | Kusters ............................ 710/36 |
| 6,144,640 A * | 11/2000 | Simpson et al. .............. 370/236 |
| 7,406,098 B2 * | 7/2008 | Taneja et al. ................... 370/468 |
| 2004/0001493 A1 * | 1/2004 | Cloonan et al. ........... 370/395.42 |
| 2009/0147731 A1 * | 6/2009 | Chion et al. .................... 370/328 |
| 2009/0219937 A1 * | 9/2009 | Liu et al. ......................... 370/392 |
| 2011/0116460 A1 * | 5/2011 | Kovvali et al. ................ 370/329 |
| 2011/0235509 A1 * | 9/2011 | Szymanski .................... 370/230 |
| 2011/0261688 A1 * | 10/2011 | Sharma et al. ................ 370/230 |
| 2011/0310738 A1 * | 12/2011 | Lee et al. ....................... 370/235 |
| 2012/0207022 A1 * | 8/2012 | Grayson et al. ............... 370/235 |
| 2013/0028127 A1 * | 1/2013 | Zheng et al. ................... 370/252 |

* cited by examiner

*Primary Examiner* — Edan Orgad
*Assistant Examiner* — Vanneilian Lalchinthang

(57) ABSTRACT

Quality of service may be achieved in a network using time-bases queues that are associated with different maximum latency periods. A device may receive a request to allocate resources for a packet flow, the resources being allocated at a number of network devices. The device may select, in response to the request, a set of queues that includes a queue selected at each of the network devices, the selected queue, at each of the network devices, being associated with a maximum latency period. The device may transmit one or more messages, to the network devices, indicating that the selected set of queues are to be used for buffering of the packet flow during packet scheduling.

18 Claims, 10 Drawing Sheets

510 →

| Network Device 520 | Time-Based Queues 530 |
|---|---|
| Base Station 225 | <Available Time-Based Queues 1> |
| SGW 240 | <Available Time-Based Queues 2> |
| PGW 227 | <Available Time-Based Queues 3> |
| ⋮ | ⋮ |

| Queue 550 | Maximum Latency Period 560 | Queue State 570 |
|---|---|---|
| Q1 | 5ms | In Use |
| Q2 | 10ms | Available |
| Q3 | 20ms | Available |
| ⋮ | ⋮ | ⋮ |

Fig. 5B

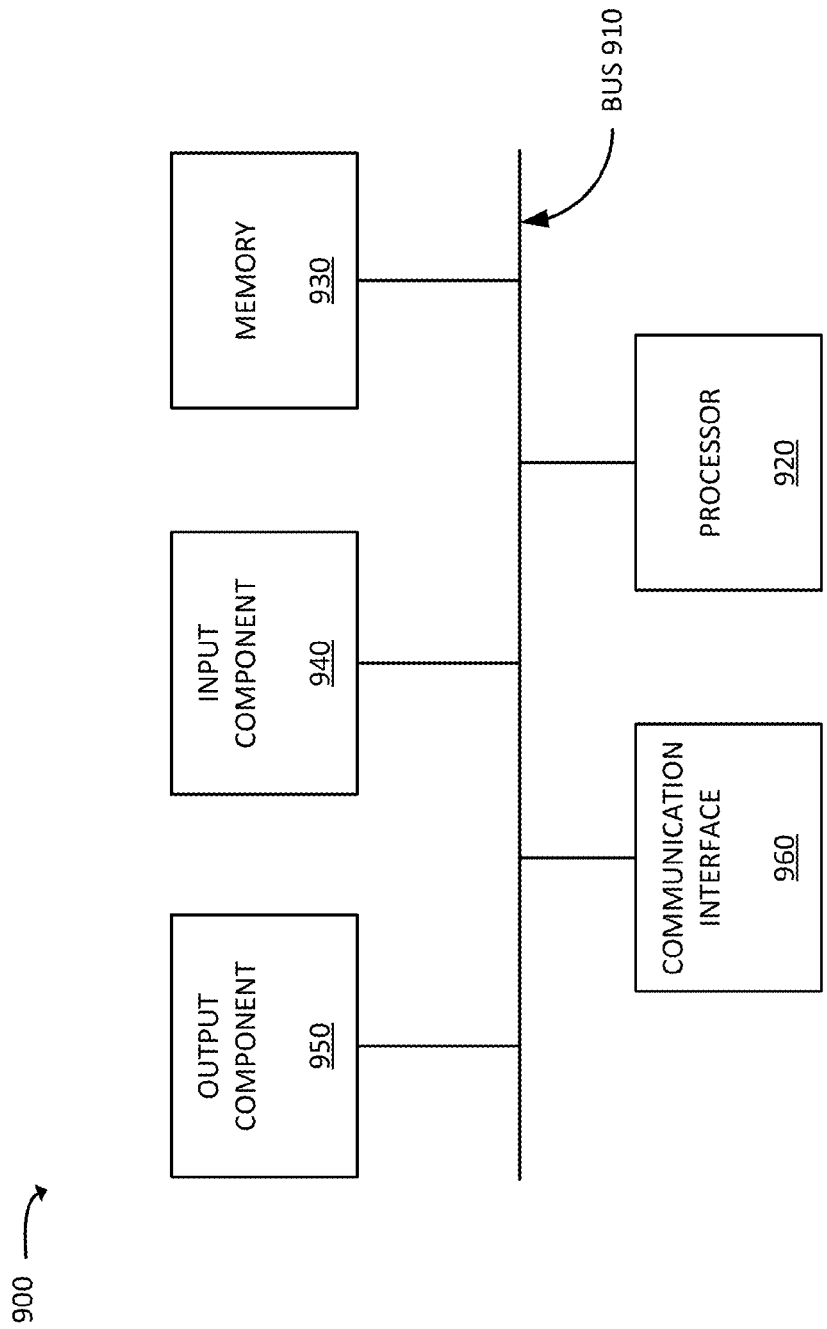

TIME-BASED QOS SCHEDULING OF NETWORK TRAFFIC

BACKGROUND

Quality of Service (QoS) may refer to the transport of network traffic with special requirements relating to the quality of the network connection. The special requirements may relate to the ability to provide different applications, users, or data flows, with different levels of service. For example, a particular level of QoS may guarantee a required bit rate, delay, jitter, packet dropping probability, and/or bit error rate. QoS guarantees can be important when the network capacity is insufficient or burdened. Certain applications, such as real-time streaming multimedia applications (e.g., voice over IP) may require, in order to be useful to the end-user, a higher QoS guarantee, while other applications, such as ones related to the downloading of a file, may be effective with QoS guarantees corresponding to a lower level of network service.

A network that supports QoS may include one or more network devices that process network traffic. Each of the network devices may include a packet scheduler. Each packet scheduler may, based on priorities assigned to packets, schedule the packets for transmission from the network device. Existing packet schedulers may schedule network traffic based on the relative priorities of the network traffic.

BRIEF DESCRIPTION OF THE DRAWINGS

FIGS. 5A and 5B are diagrams illustrating an example of data structures that may be maintained by the QoS controller shown in FIG. 2B;

FIG. 9 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may provide for time-based QoS scheduling in which at least some of the queues maintained by a packet scheduler, in a network device, are time-based queues for which packets entering the queues are guaranteed to be selected by the packet scheduler within a particular time period. A network device may include a number of time-based queues, each potentially associated with a different time period. In some implementations, each of the time-based queues may be assigned a particular queue length, which may effectively assign an upper bound for the service time of the queue and thus define the particular time period of the queue.

Packet flows that are assigned to the time-based queues may be assigned based on the available time-based queues at a number of different network devices in a path of the packet flow. For example, a QoS controller may choose a series of time-based queues, where each time-based queue may be associated with a different maximum latency period, and each time-based queue may be maintained by a different network device in the path of the packet flow. The QoS controller may manage the series of time-based queues, for the packet flow, so that the maximum end-to-end latency of the time-based queues conforms to a QoS requirement of the packet flow.

Figure 1:
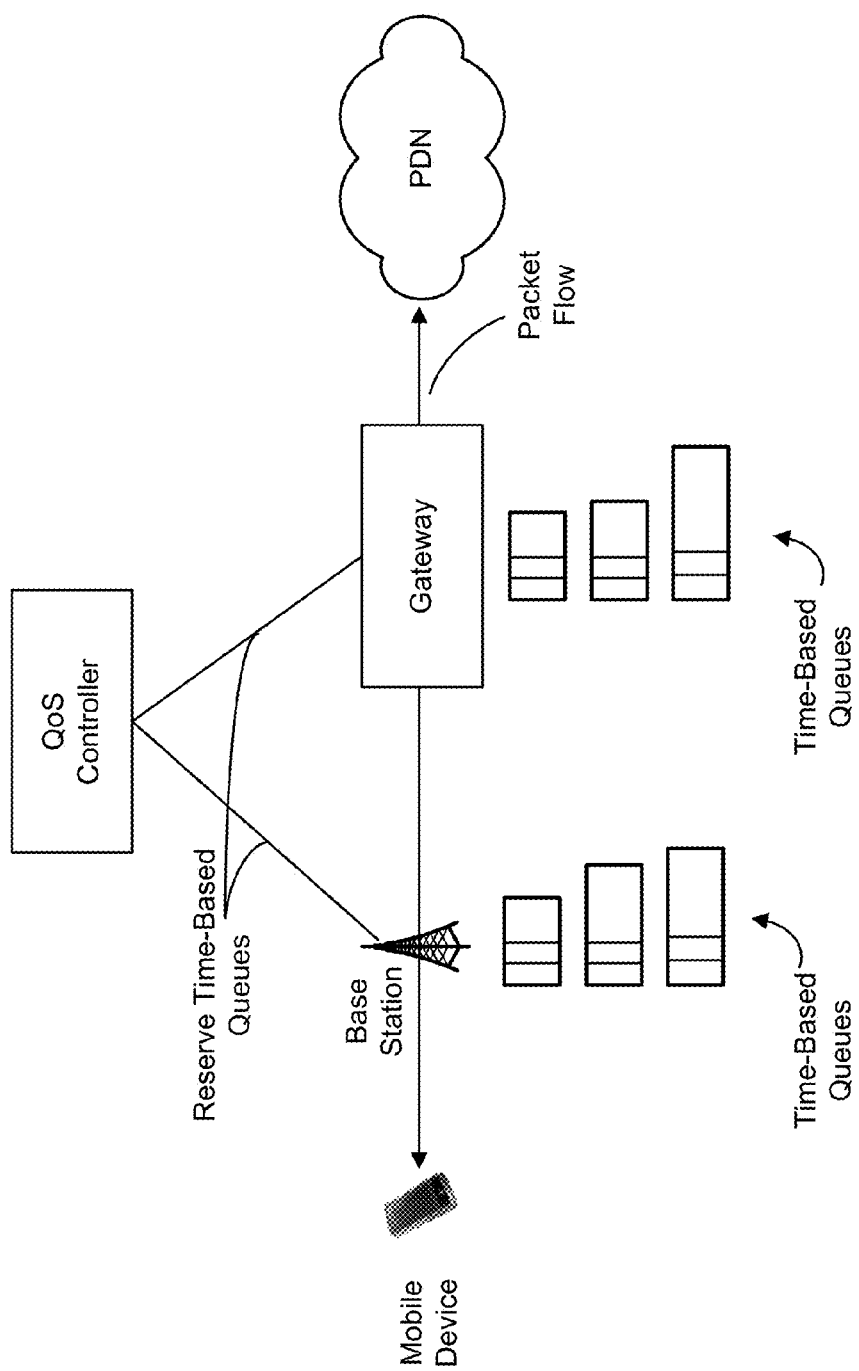
FIG. 1 is a diagram conceptually illustrating an example of an overview of concepts described herein.

FIG. 1 is a diagram conceptually illustrating an example of an overview of concepts described herein. As shown in FIG. 1, a QoS controller may be coupled to a number of different network devices. In some implementations, the QoS controller may be a device in a cellular network, such as a Long Term Evolution (LTE) network. Two example network devices are illustrated in FIG. 1: a base station and a gateway. The base station may provide a radio interface for a mobile device, such as a cellular telephone or smart phone. The gateway may act as an interface to an external network, such as a packet data network (PDN). The base station and the gateway may each be associated with a number of time-based queues. Each of the time-based queues may be associated with a certain maximum latency period. For example, each of the time-based queues may be assigned a certain size (e.g., memory buffer size), which may correspond to a particular maximum time that a queued packet may spend in the queue. As illustrated in FIG. 1, the base station may be associated with a first set of time-based queues, each of which may be associated with different maximum queue times. Similarly, the gateway may be associated with another set of time-based queues, each of which may be associated with different maximum queue times.

The QoS controller may assign the packet flow to a queue in each of the network devices. For example, the QoS controller may assign the packet flow to the shortest queue (i.e., the queue with the lowest maximum latency period) in the gateway and a longer queue in the base station. The total maximum end-to-end latency, for the packet flow, may be based on the sum of the two maximum latency periods.

With the time-based queues discussed herein, a QoS controller may perform end-to-end QoS scheduling based on the available time-based queues in a number of network devices. Advantageously, QoS scheduling may be flexibly performed over the entire path of a packet flow.

Figure 2A:
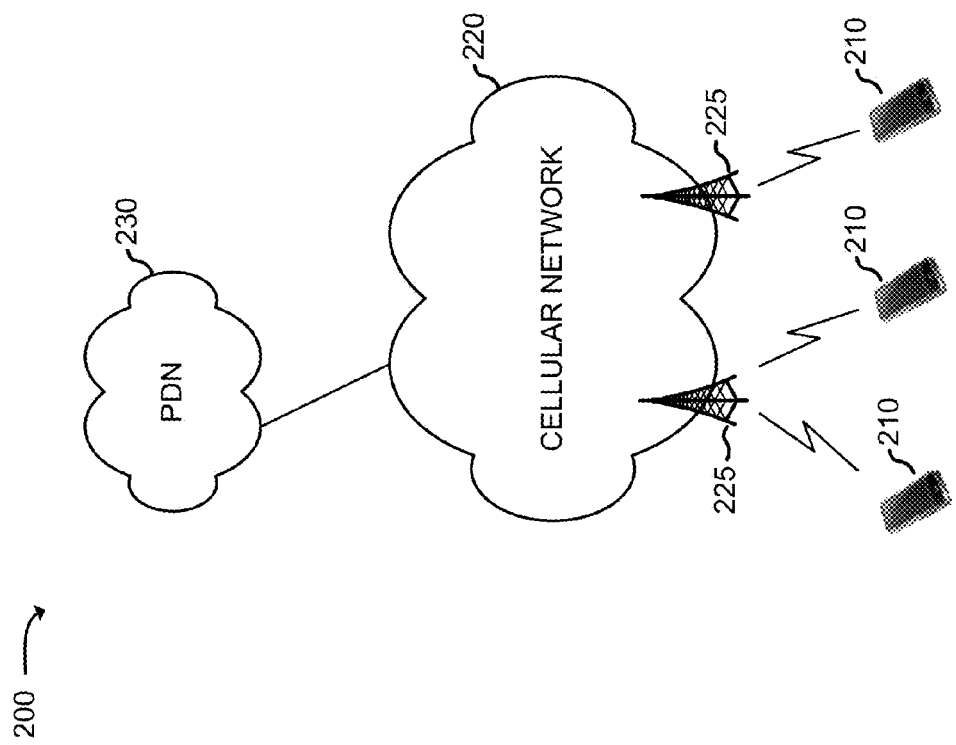
FIG. 2A is a diagram of an example environment in which systems and/or methods described herein may be implemented.

FIG. 2A is a diagram of an example environment 200 in which systems and/or methods described herein may be implemented. As illustrated, environment 200 may include one or more mobile devices 210, cellular network 220, and PDN 230.

Mobile devices 210 may include portable computing and communication devices, such as personal digital assistants (PDAs), smart phones, cellular phones, laptop computers with connectivity to a cellular wireless network, tablet computers, etc. Mobile devices 210 may also include non-portable computing devices, such as desktop computers, consumer or business appliances, set-top devices (STDs), or other devices that have the ability to connect to cellular network 220. Mobile devices 210 may connect, through a radio link, to cellular network 220. Through the radio link, mobile devices 210 may obtain data and/or voice services.

Cellular network 220 may include one or more devices that include radio interfaces to provide wireless connections to mobile devices 210. In addition, cellular network 220 may include network devices to provide core functionality relating to creating and managing communications with mobile devices 210. In one implementation, cellular network 220 may include a long term evolution (LTE) network. In this situation, cellular network 220 may be implemented using a flat, IP-based network architecture that includes one or more network devices or components that facilitate the providing of network access to mobile devices 210.

Cellular network 220, as illustrated, may include one or more base stations 225. In the context of an LTE network, each base station 225 may be referred to as an Evolved Node B (eNodeB). Each base station 225 may provide a radio interface over which the base station may communicate with mobile devices 210. Cellular network 220 may connect to one or more other networks, such as to PDN 230 (e.g., the Internet), to provide network services to mobile devices 210.

Figure 2B:
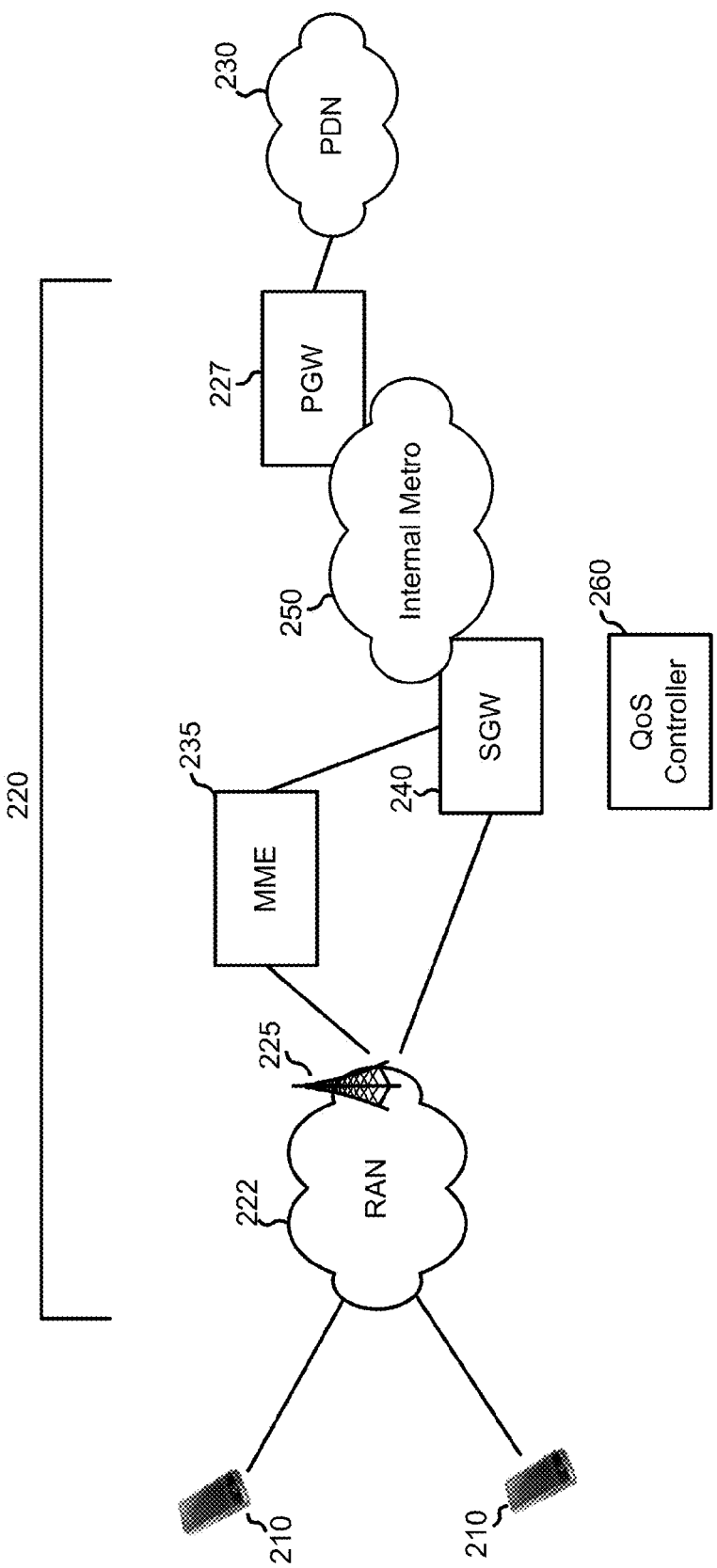
FIG. 2B is a diagram that illustrates a more detailed view of portions of the example environment shown in FIG. 2A.

FIG. 2B is a diagram that illustrates a more detailed view of portions of example environment 200. In particular, FIG. 2B illustrates an example environment 200, in which cellular network 220 includes an LTE-based network. Alternatively, the concepts described herein may be applied to technologies other than LTE.

In FIG. 2B, cellular network 220 may include a network implemented based on LTE network technologies. As shown in FIG. 2B, cellular network 220 may include radio access network (RAN) 222, base station 225, mobility management entity (MME) 235, serving gateway (SGW) 240, packet data network gateway (PGW) 227, and QoS controller 260. MME 235, SGW 240, PGW 227, and QoS controller 260 may be connected to one another, and to other devices, through one or more networks that are local to cellular network 220. For example, internal metro network 250, which may include a service provider metro network or high speed optical core network, may be used to transport traffic between SGW 240 and PGW 227.

RAN 222 may represent the radio interface between mobile devices 210 and base station 225. RAN 222 may include, for example, orthogonal frequency-division multiplexing (OFDM) and/or single-carrier frequency-division multiple access (SC-FDMA) based radio interfaces. RAN 222 may be implemented by radio modems in mobile devices 210 and corresponding radio modems implemented by base stations 225.

MME 235 may include one or more computation and communication devices that perform signaling for cellular network 220. MME 235 may, for example, be responsible for authenticating mobile devices 210, maintaining location information for mobile devices 210, and selecting a PGW 227 to service a particular mobile device 210. SGW 240 may include one or more computation and communication devices that route and forward user data packets. SGW 240 may route and forward user packets and also act as a mobility anchor during inter-base station handoffs.

PGW 227 may include one or more computation and communication devices that provide connectivity from mobile devices 210 to PDN 230. PGW 227 may provide connectivity from mobile devices 210 to a PDN 230 by being the point of exit and entry of traffic for mobile devices 210. A mobile device 210 may have simultaneous connectivity with more than one PGW 227 for accessing multiple PDNs 230. PGW 227 may perform policy enforcement, packet filtering, and charging support.

A QoS controller 260 is additionally illustrated in FIG. 2B. QoS controller 260 may generally act to setup and manage QoS aspects of packet flows in cellular network 220. QoS controller 260 may, for example, communicate with base station 225, SGW 240, and PGW 227 to obtain the state (e.g., an "in use" state or a "not in use" state) of one or more time-based queues that are maintained by base station 225, SGW 240, and PGW 227. QoS controller 260 may also receive requests to establish a packet flow in cellular network 220. Based on the requests, QoS controller 260 may determine the path of the corresponding packet flow (e.g., the network devices that are involved in the packet flow) and schedule time-based queues for each of the network devices in the path of the packet flow. QoS controller 260 may schedule time-based queues based on an end-to-end scheduling technique, in which the maximum latency of each of the time-based queues, in the path of the packet flow, are taken into account by QoS controller 260.

For example, QoS controller 260 may select time-based queues such that the sum of the maximum latencies of each of the selected time-based queues is below a particular threshold value. The particular threshold value may be determined, for example, by QoS controller 260 based on the type of application (e.g., voice over IP, a video connection, etc.), by another network device, and/or may be requested by the application that initiates the packet flow. The operation of QoS controller 260 will be described in more detail below.

Although FIGS. 2A and 2B illustrate example components of environment 200, in other implementations, environment 200 may contain fewer components, different components, differently arranged components, or additional components than those depicted in FIGS. 2A and/or 2B. Alternatively, or additionally, one or more components of environment 200 may perform one or more other tasks described as being performed by one or more other components of environment 200.

Figure 3:
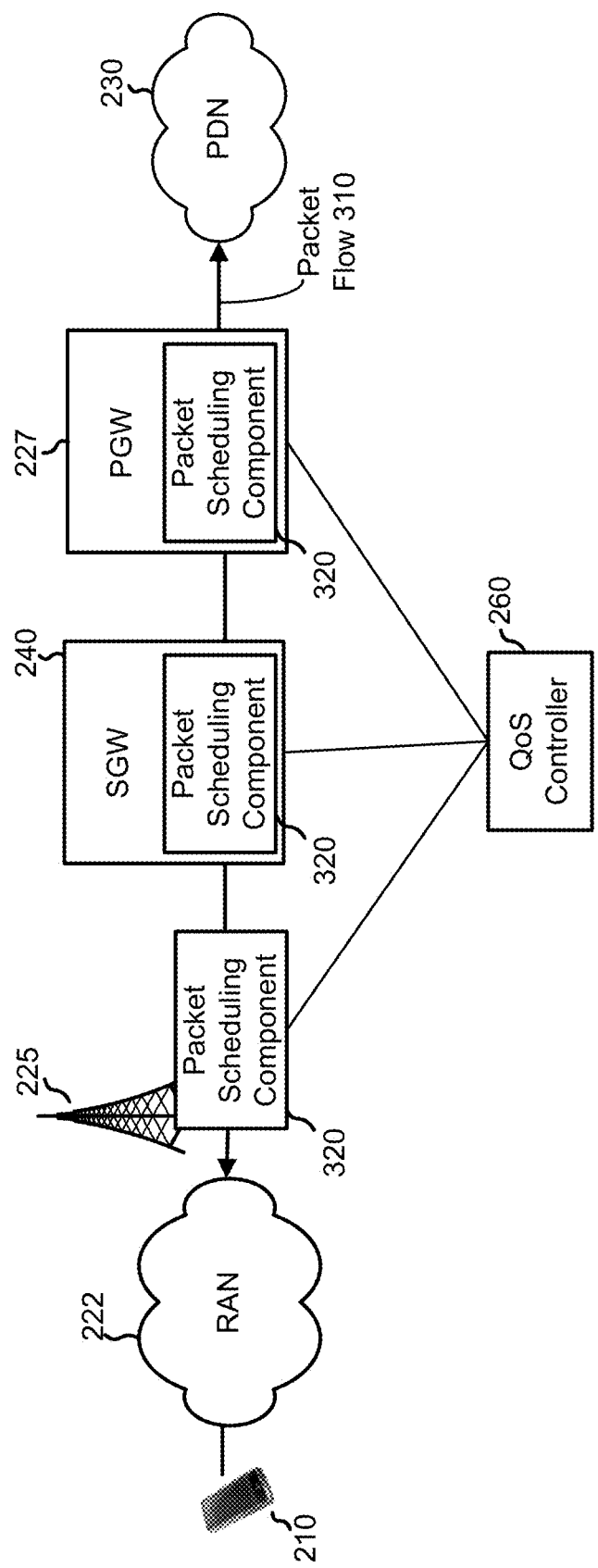
FIG. 3 is a diagram illustrating an example of functional components that may be involved in QoS scheduling of a packet flow.

FIG. 3 is a diagram illustrating an example of functional components that may be involved in QoS scheduling of a packet flow. In FIG. 3, packet flow 310, between mobile device 210 and PDN 230, includes a network path that traverses base station 225, SGW 240, and PGW 227. Each of base station 225, SGW 240, and PGW 227 may include a packet scheduling component 320. Packet scheduling component 320 may generally act to schedule the transmission or processing of packets. The packets may be scheduled for transmission based on parameters relating to QoS objectives. For example, some packet flows may be assigned QoS priority levels. The QoS priority levels may be used by packet scheduling component 320 when determining the order of packet transmission, in which higher priority packets may generally be transmitted before lower priority packets. A number of different scheduling techniques may be used to schedule the transmission of packets based on the relative priorities of the packets, including a weighted round robin (WRR) queuing technique, a weighted fair queuing (WFQ) technique, or other techniques.

Consistent with aspects described herein, packet scheduling component 320, in addition to or in lieu of providing queues to perform QoS scheduling based on conventional QoS techniques, may additionally provide one or more time-based queues. As previously mentioned, each time-based queue may be allocated a particular length (e.g., a particular amount of memory) or otherwise be associated with a maximum latency period corresponding to the maximum amount of time in which packets that are queued to the time-based queue will be in the queue before being de-queued and transmitted from the corresponding network device. QoS controller 260 may communicate with packet scheduling components 320 to assign particular time-based queues to particular packet flows. Because each time-based queue may be associated with a maximum latency period, QoS controller 260 may select the time-based queues based on end-to-end policy considerations, such as the total latency in the network path. The operation of packet scheduling component 320 and QoS controller 260 will be described in more detail below.

Although three network devices (base station 225, SGW 240, and PGW 227) are illustrated in FIG. 3, in other implementations, additional or fewer network devices may be in the path of packet flow 310. Additionally, other types of network devices, such as routers and switches, could alternatively be in the path of packet flow 310 and include a packet scheduling component 320.

Figure 4:
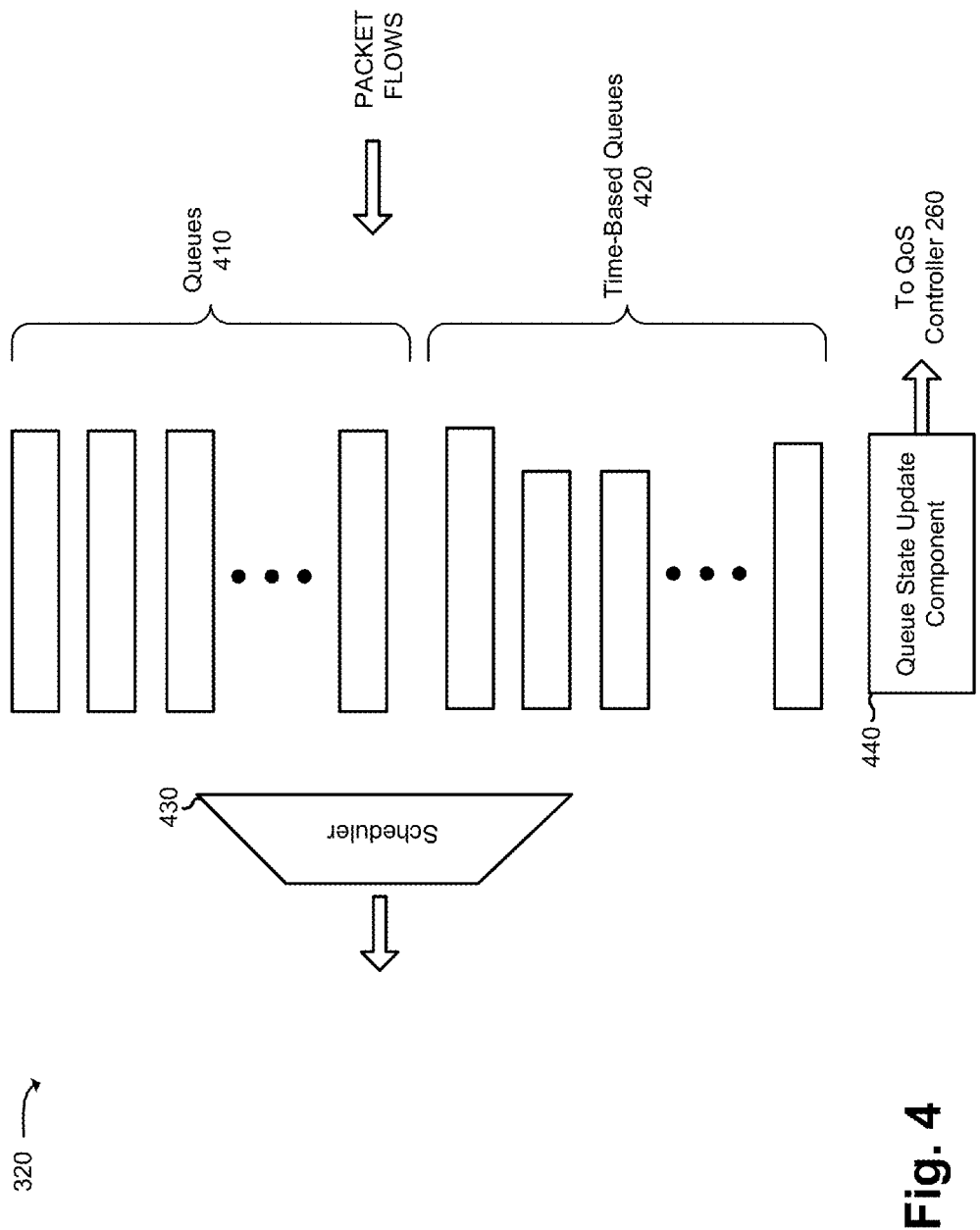
FIG. 4 is a diagram illustrating an example of functional components that may be included in one of the packet scheduling components shown in FIG. 3.

FIG. 4 is a diagram illustrating an example of functional components that may be included in one of packet scheduling components 320. As shown, packet scheduling component 320 may include a number of queues 410 and 420, a scheduler 430, and a queue state update component 440.

Queues 410 may each include a first-in first-out (FIFO) queue that is used to buffer incoming traffic, such as incoming packetized traffic, before the traffic is transmitted from the network device. Queues 410 may represent conventional queues that may be used to buffer packets before selection by scheduler 430. For example, queues 410 may be of equal length (e.g., memory size) and may be used to buffer incoming packets. Scheduler 430 may schedule the order through which packets are de-queued from queues 410 based on a number of scheduling techniques. For example, each queue 410 may be associated with a QoS priority level, that may be used by scheduler 430 in determining the selection order by which packets are selected from queues 410. A number of different scheduling techniques are known and can be used to schedule the transmission of packets based on the relative priorities of the packets, including a WRR queuing technique, a WFQ technique, or other techniques.

Queues 420 may include time-based queues. A time-based queue, as described herein, may refer to a queue that is associated with a known maximum latency period. Different time-based queues 420 may be associated with different maximum latency periods. In some implementations, the different maximum latency periods of time-based queues 420 may be implemented by assigning different queue lengths (e.g., allocating different amounts of memory) to different time-based queues 420. Thus, at each packet scheduling component 320, a number of varying length time-based queues 420 may be available, at any particular time, to assign to a new packet flow. In some implementations, time-based queues 420 may each be a FIFO queue that is used to buffer incoming traffic. Queues 410 and time-based queues 420 may be assigned from a single memory pool.

Scheduler 430 may schedule the order through which packets are de-queued from time-based queues 420 based on a number of scheduling techniques. The scheduling techniques may be implemented to ensure that packets queued to a particular one of the time-based queues 420 are selected from the time-based queue 420 before the maximum latency period, associated with the time-based queue 420, elapses.

Queue state update component 440 may transmit state information, relating to the usage state of time-based queues 420, to QoS controller 260. Queue state update component 440 may, for example, monitor the states of time-based queues 420 and correspondingly update QoS controller 260. For example, queue state update component 440 may inform QoS controller 260 when a time-based queue 420, at the particular network device, is reserved and/or being used to service a packet flow.

Although FIG. 4 illustrates an example of functional components that may be included in packet scheduling component 320, in other implementations, packet scheduling component 320 may contain fewer components, different components, differently arranged components, or additional components than those depicted in FIG. 4. Alternatively, or additionally, one or more components of packet scheduling components 320 may perform one or more other tasks described as being performed by one or more other components of packet scheduling component 320.

FIGS. 5A and 5B are diagrams illustrating an example of data structures that may be maintained by QoS controller 260. As shown in FIG. 5A, data structure 510 may be used to maintain available network devices, in environment 200, that include packet scheduling component 320. Data structure 510 may include network device field 520 and time-based queues field 530. Network device field 520 may store an identification of a network device that uses time-based queues. In some implementations, network device field 520 may store a name of the network device, an address of the network device, and/or other information that may be used to identify the network device. Alternatively or additionally, network device field 520 may include an indication of the role of the network device in environment 200. For example, for an LTE network, network device field 520 may include an indication of whether the device is a base station, SGW, or PGW. In the example of FIG. 5A, three example network devices are illustrated as being stored in data structure 510: base station 225, SGW 240, and PGW 227.

Time-based queues field 530 may store information about the time-based queues that are maintained by the network device identified in network device field 520. In some implementations, for each network device, the number of queues, the maximum latency period of each queue, the queue state (e.g., "in-use" or "available"), and/or other information may be maintained in the entry corresponding to time-based queues field 530. Time-based queues field 530 may include, for example, a reference or link to a data structure that contains the information about time-based queues 420. An example data structure that contains the information about the time-based queues 420 is illustrated in FIG. 5B.

As shown in FIG. 5B, data structure 540 may store information relating to time-based queues for a particular network device identified in network device field 520. Data structure 540 may correspond to a data structure identified in time-based queues field 530. Data structure 540 may include queue field 550, maximum latency period field 560, and queue state field 570. Queue field 550 may store information that identifies a particular queue (e.g., "Q1", "Q2") at the network device corresponding to data structure 540. Maximum latency period field 560 may store the maximum latency period associated with the corresponding time-based queue (e.g., 5 ms, 10 ms, 20 ms, etc.). Queue state field 570 may store a value indicating an in-use state with the corresponding time-based queue. For example, time-based queue 420 may be in the state "in use" when a packet flow is assigned to the queue, and "available" when a packet flow is not currently assigned to the queue. Queue state field 570 may be used by QoS controller 260 when determining which time-based queues are available, from a particular network device, to assign to a packet flow.

A number of example data fields were described above as being included in data structures 510 and 540. In alternative or additional implementations, data structures 510 and/or 540 may include different or additional fields. Moreover, although data structures 510 and 540 are illustrated as tables in FIGS. 5A and 5B, data structures 510 and 540 could be implemented as other data structures (e.g., a file structure, a linked list, etc.)

Figure 6:
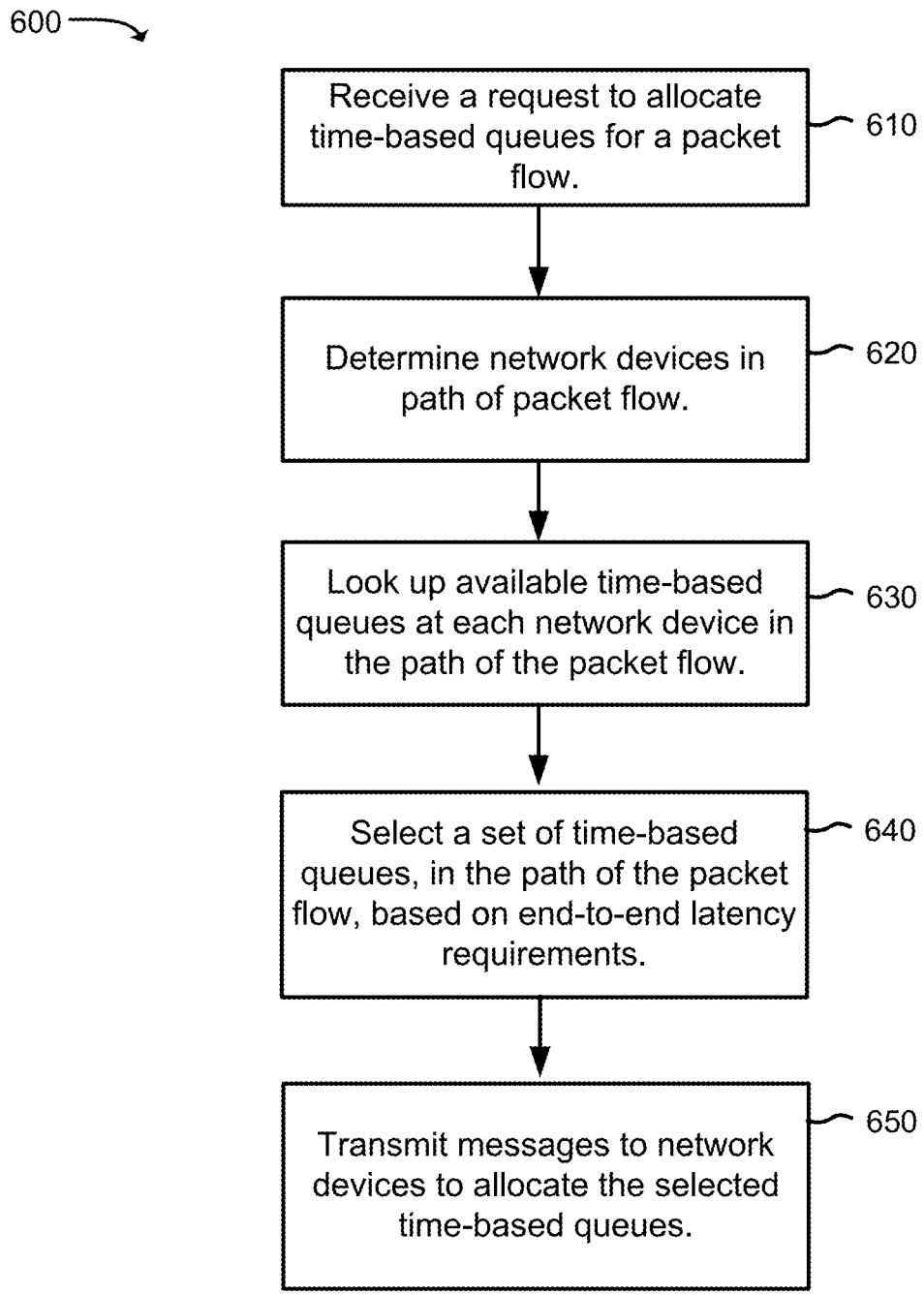
FIG. 6 is a flow chart illustrating an example process for using time-based queues in QoS scheduling.

FIG. 6 is a flow chart illustrating an example process 600 for using time-based queues in QoS scheduling. In one implementation, process 600 may be performed by QoS controller 260.

Process 600 may include receiving a request to allocate time-based queues for a packet flow (block 610). A packet flow may correspond to, for example, packets from a particular device or server, packets associated with a particular application type (e.g., voice over IP packets, video packets, etc.) and/or other groupings of packets. A request for a packet flow may be initiated by an application, network device, a user, or some other entity. In some implementations, time-based queues 420 may be allocated in an end-to-end manner over a particular network, such as an LTE cellular network. The request for the packet flow may be received from, for example, a device in PDN 230, PGW 227, or from mobile device 210. The request may include certain QoS parameters, such as a maximum latency period (e.g., the "end-to-end period") and an indication of the maximum bandwidth that may be used by the packet flow.

Process 600 may further include determining network devices in the path of the packet flow (block 620). In some implementations, QoS controller 260 may look up or otherwise determine the network devices that implement time-based queues 420 and that will receive packets as part of the packet flow. For example, as shown in the example of FIG. 3, QoS controller 260 may determine that base station 225, SGW 240, and PGW 227 will be the network devices in the packet flow between mobile device 210 and PDN 230.

Process 600 may further include looking up available time-based queues at each network device in the path of the packet flow (block 630). For example, QoS controller 260 may maintain data structures, such as data structures illustrated in FIGS. 5A and 5B. QoS controller 260 may look up information relating to the availability of time-based queues 420, at various network devices, using the data structures.

Process 600 may further include selecting a set of time-based queues, in the path of the packet flow, based on end-to-end latency requirements of the packet flow (block 640). A number of techniques may be used to select the set of time-based queues. For example, QoS controller 260 may select one available time-based queue 420 from each network device in the path of the packet flow, based on the condition that the sum of the maximum latency periods of the selected time-based queues should be less than a threshold (e.g., a maximum latency period received as part of the request for the packet flow).

In some implementations, the sum of the maximum latency periods may be selected to be less than the threshold but otherwise to be as large as possible. This condition may be desirable to allow QoS controller 260 to allocate the required level of resources without over-allocating resources to a particular packet flow. For example, if the threshold value is 20 ms a combination of time-based queues that gives a 19 ms maximum latency period may be preferentially selected over a combination of time-based queues that gives a 15 ms maximum latency period.

In general, QoS controller 260 may act to allocate time-based queues such that QoS controller 260 may manage the time-based queues on a global basis (e.g., by considering the available time-based queues over all the network devices in the path of the packet flow). For instance, if a particular network device is running short of available low latency time-based queues, QoS controller 260 may preferentially allocate a longer latency time-based queue for that particular network device and correspondingly allocate low latency time-based queues from other network devices.

Process 600 may further include transmitting messages to the network devices to allocate the selected time-based queues (block 650). Each message may be destined for a network device that is in the path of the packet flow and may indicate which time-based queue is to be allocated to the packet flow.

Figure 7:
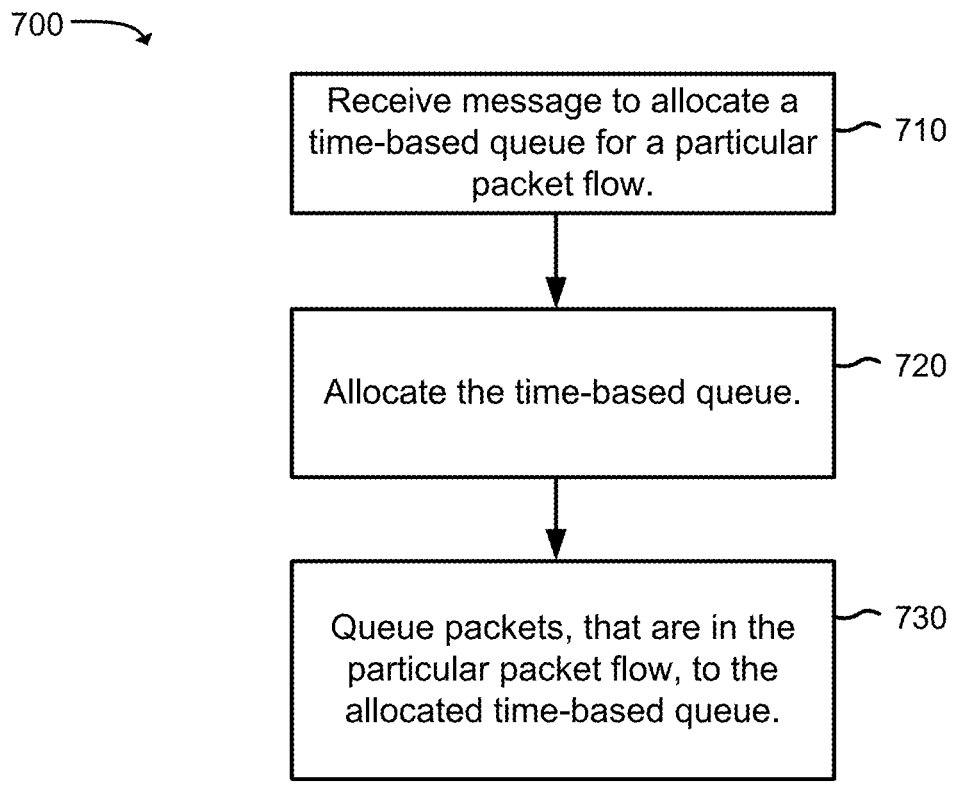
FIG. 7 is a flow chart illustrating an example process for using time-based queues in QoS scheduling.

FIG. 7 is a flow chart illustrating an example process 700 for using time-based queues in QoS scheduling. In one implementation, process 700 may be performed by network devices that maintain time-based queues 420 (e.g., with reference to FIG. 3, base station 225, SGW 240, and/or PGW 227).

Process 700 may include receiving a message to allocate a time-based queue for a particular packet flow (block 710). The messages may be received from QoS controller 260. The message may include, for example, an indication of the time-based queue 420 that is to be allocated and an indication of the packet flow that is to be buffered with the corresponding time-based queue 420. In response, the network device may queue packets, for the particular packet flow, to the allocated time-based queue (block 730). In some implementations, the queued packets may include packets that are incoming to the network device or packets that have been processed and are ready for transmission by the network device. Queuing the packets, for a particular packet flow and to a time-based queue, may result in the packets being processed by the network device within the maximum latency period that corresponds to the time-based queue.

Figure 8:
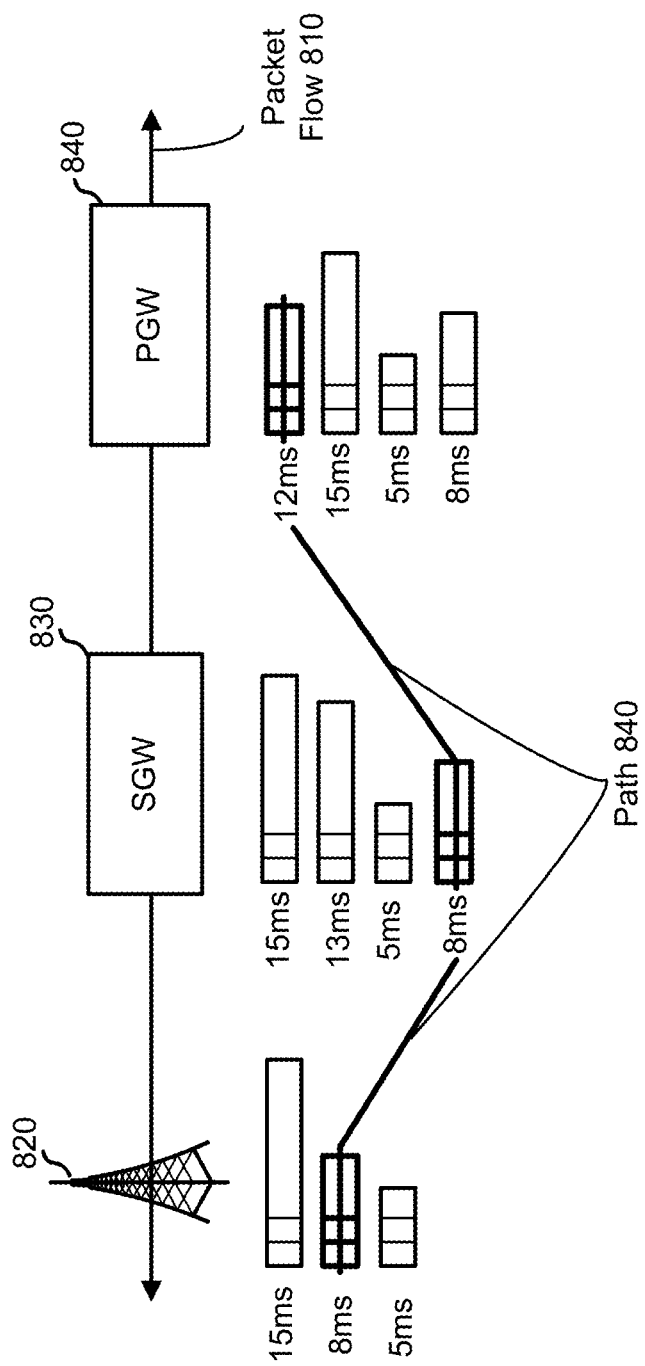
FIG. 8 is a diagram conceptually illustrating selection of a number of time-based queues in the network path of a packet flow.

FIG. 8 is a diagram conceptually illustrating selection of a number of time-based queues in the network path of a packet flow. As illustrated, assume a network path for a packet flow 810, such as a network path through an LTE core network, includes base station 820, SGW 830, and PGW 840. Base station 820 may include a number of time-based queues, including a queue with a 15 ms maximum latency period, a queue with an 8 ms maximum latency period, and a queue with a 5 ms maximum latency period. Similarly, SGW 830 may include time-based queues having maximum latency periods of: 15 ms, 13 ms, 5 ms, and 8 ms. PGW 840 may similarly include time-based queues having maximum latency periods of: 12 ms, 15 ms, 5 ms, and 8 ms.

In the example of FIG. 8, assume that QoS policies for packet flow 810 indicate that the end-to-end latency for packet flow 810 should be less than 30 ms. Based on this latency requirement, QoS controller 260 may allocate the 8 ms time-based queue from base station 820, the 8 ms time-based queue from SGW 830, and the 12 ms time-based queue from PGW 840. Packet flow 810 may thus be buffered using the queue path labeled as path 840. The total maximum end-to-end latency for path 840, due to buffering at the network devices, may be 28 ms (8 ms+8 ms+12 ms).

Time-based queues, as discussed above, may provide for end-to-end network QoS control in which QoS controller 260 can be used to perform network level fine-grain QoS scheduling. In particular, a set of queues, each of which may be associated with a different maximum latency period, may be selected by QoS controller 260 to provide QoS scheduling.

FIG. 9 is a diagram of example components of a device 900. Each of the devices and/or network devices illustrated in FIGS. 1-4 may include one or more devices 900. Device 900 may include bus 910, processor 920, memory 930, input component 940, output component 950, and communication interface 960. In another implementation, device 900 may include additional, fewer, different, or differently arranged components. For example, device 900 may be a network device designed to process network traffic at line speed and may accordingly include special purpose hardware designed to quickly process the network traffic. Some non-limiting examples of device 900, with additional and/or different components, are discussed below.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as a wide area/cellular network radio transceiver, an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface. Device 900 may perform certain operations relating to computing an estimated location of a device and/or a distance of the device from a base station. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by a device, a request to allocate resources for a packet flow;
   maintaining, by the device, state information of a plurality of queues associated with a plurality of network devices, the state information including an availability state of each of the plurality of queues, the availability state indicating, for each of the plurality of queues, when a particular queue is in an in-use state and when the particular queue is in an available state;
   selecting, by the device and in response to the request, a set of queues that includes a queue selected from among the plurality of queues associated with each of a plurality of network devices, the selected queue, at each of the plurality of network devices, being associated with a maximum latency period, and the device selecting the set of queues based on the state information and such that a sum of the maximum latency periods associated with the queues in the set of queues is below a threshold value, the threshold value corresponding to a maximum permissible latency value for the packet flow as the packet flow passes through the plurality of network devices; and
   transmitting, by the device, one or more messages, to the plurality of network devices, the one or more messages indicating that the selected set of queues are to be used for buffering of the packet flow during packet scheduling by the network devices.

2. The method of claim 1, wherein selecting the set of queues further includes:
   determining, for each of the plurality of network devices, a second set of queues that are being maintained by each of the plurality of network devices, each of the queues in the second set of queues being associated with a maximum latency period and at least some of the maximum latency periods being different from one another; and
   selecting, as the queue selected at each of the plurality of network devices, one of the queues, in the second set of queues, for each of the plurality of network devices.

3. The method of claim 1, wherein the plurality of network devices correspond to network devices in a path of the packet flow.

4. The method of claim 1, further comprising:
determining the maximum permissible latency value for the packet flow based on a quality of service (QoS) policy associated with the packet flow.

5. The method of claim 1, wherein the plurality of network devices include network devices in a long term evolution (LTE) network.

6. The method of claim 5, wherein the plurality of network devices include at least two of a cellular base station, a serving gateway (SGW), and a packet data network gateway (PGW).

7. The method of claim 1, wherein the state information additionally includes information relating to an availability of the maximum latency period of each of the queues in the set of queues.

8. A device comprising:
a memory device;
at least one processor to execute instructions from the memory device to:
receive a request to allocate resources for a packet flow;
maintain, by the device, state information of a plurality of queues associated with a plurality of network devices, the state information including an availability state of each of the plurality of queues, the availability state indicating, for each of the plurality of queues, when a particular queue is in an in-use state and when the particular queue is in an available state;
select, in response to the request, a set of queues that includes a queue selected from among the plurality of queues associated with each of a plurality of network devices, the selected queue, at each of the plurality of network devices, being associated with a maximum latency period, and the device selecting the set of queues based on the state information and such that a sum of the maximum latency periods associated with the queues in the set of queues is below a threshold value, the threshold value corresponding to a maximum permissible latency value for the packet flow as the packet flow passes through the plurality of network devices; and
transmit one or more messages, to the plurality of network devices, the one or more messages indicating that the selected set of queues are to be used for buffering of the packet flow during packet scheduling by the network devices.

9. The device of claim 8, wherein the at least one processor, when selecting the set of queues, is further to:
determine, for each of the plurality of network devices, a second set of queues that are being maintained by each of the plurality of network devices, each of the queues in the second set of queues being associated with a maximum latency period and at least some of the maximum latency periods being different from one another; and
select, as the queue selected at each of the plurality of network devices, one of the queues, in the second set of queues, for each of the plurality of network devices.

10. The device of claim 8, wherein the plurality of network devices correspond to network devices in a path of the packet flow.

11. The device of claim 8, further comprising:
determining the maximum permissible latency value for the packet flow based on quality of service (QoS) policies.

12. The device of claim 8, wherein the plurality of network devices include network devices in a long term evolution (LTE) network.

13. The device of claim 12, wherein the plurality of network devices include at least two of a cellular base station, a serving gateway (SGW), and a packet data network gateway (PGW).

14. A system comprising:
a plurality of network devices, each including:
a plurality of queues to queue packets, each of the plurality of queues being associated with a maximum latency period and at least some of the plurality of queues having maximum latency periods that are different than others of the plurality of queues;
a packet scheduler to perform quality of service (QoS) scheduling based on packets queued in the plurality of queues;
a QoS controller to:
receive a request to allocate resources for a packet flow, the request including a maximum permissible latency value for the packet flow as the packet flow passes through the plurality of network devices;
maintain information relating to the plurality of queues at each of the plurality of network devices, the information including:
the maximum latency period associated with each of the plurality of queues, and
an availability state of each of the plurality of queues, the availability state indicating, for each of the plurality of queues, when a particular queue is in an in-use state and when the particular queue is in an available state;
select queues, from the plurality of queues, to assign to the packet flow, the selection being made based on the maximum latency periods associated with the plurality of queues, based on the maximum permissible latency value, and based on the availability state; and
transmit one or more messages, to the plurality of network devices, to allocate the selected queues to the packet flow.

15. The system of claim 14, wherein the different maximum latency periods associated with the plurality of queues are implemented by allocating different queue sizes to the different ones of the plurality of queues.

16. The system of claim 14, wherein the QoS controller, when selecting the queues, is further to:
select the queues such that a sum of the maximum latency periods of the selected queues is less than a threshold that is determined based on a QoS policy associated with the packet flow.

17. The method of claim 1, wherein the device includes a Quality of Service (QoS) controller that is implemented externally to each of the plurality of network devices.

18. The device of claim 8, wherein the device includes a Quality of Service (QoS) controller that is implemented externally to each of the plurality of network devices.

* * * * *